Aug. 27, 1957  J. T. ELLIS  2,803,914
FISHING LINE CARRYING DEVICE
Filed Jan. 31, 1955
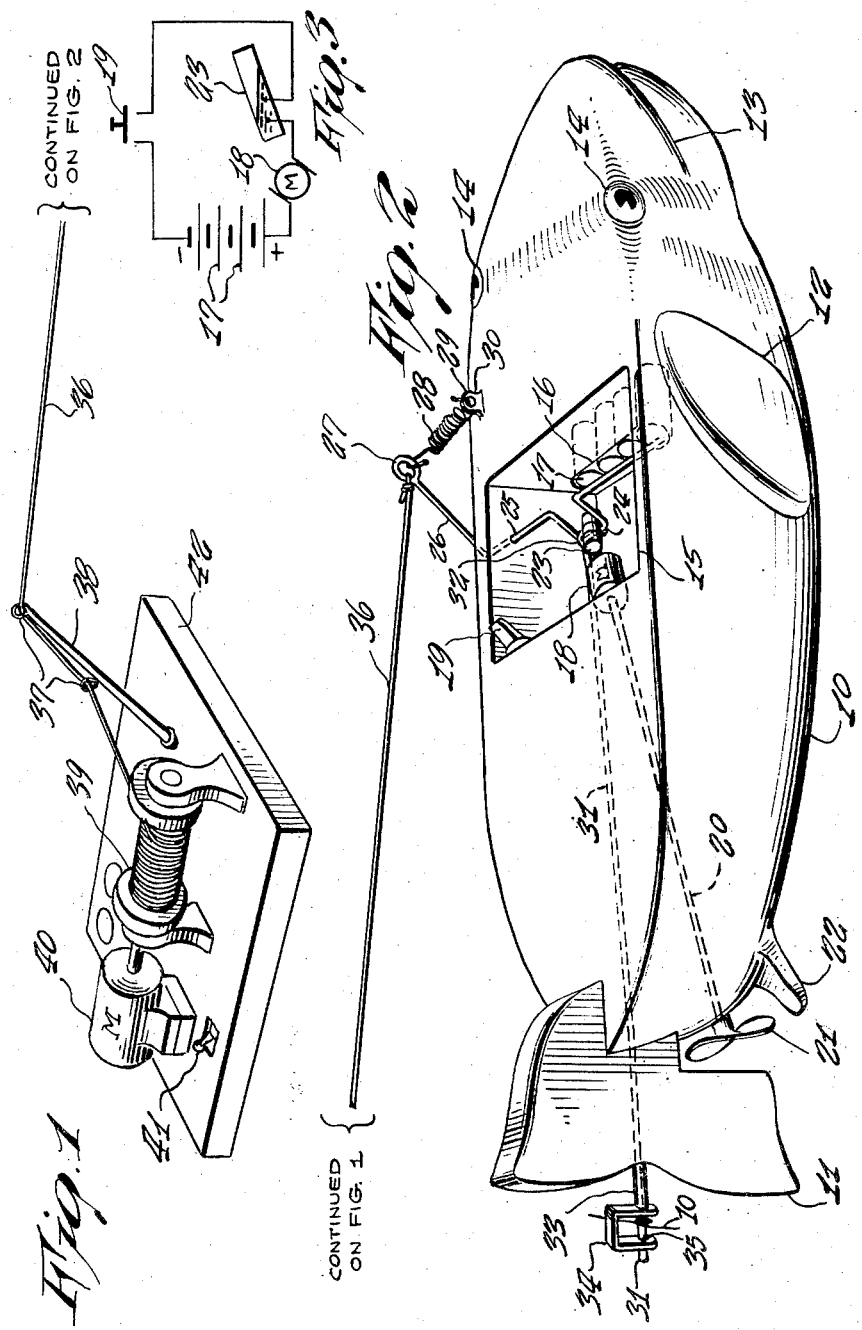
INVENTOR.
JACK T. ELLIS
BY
Carl Miller
ATTORNEY

# United States Patent Office 2,803,914
Patented Aug. 27, 1957

2,803,914

FISHING LINE CARRYING DEVICE

Jack T. Ellis, Colorado Springs, Colo.

Application January 31, 1955, Serial No. 484,888

1 Claim. (Cl. 43—26.1)

This invention relates to devices used in connection with fishing lines and more particularly to devices used to move the bait-carrying portion of fishing lines.

An object of the present invention is to provide an improved type of fishing line moving device, of simple and durable design, which can be marketed at a comparatively low price.

Another object of this invention is to provide convenient means for enabling a fisherman to drop his line at any desired location during the course of fishing without the exercise of great skill or highly developed casting techniques.

A further object of the present invention is to provide a fishing line moving device which may be easily manufactured from a material such as metal and which may be shaped and coloured to simulate the appearance of a fish.

A still further object of the invention is to provide an electrically operated, battery driven, fishing line carrying device, of compact size and adapted to travel upon the surface of water, which will be movably attached to a reeling mechanism and which makes provision for disengaging the said fishing line when the same has reached a desired location in fishing waters.

Other and more specific objects of the present invention will be apparent from the following description as read in connection with the accompanying drawing, the novel features of this invention being pointed out in the claims at the end of the specification.

Fig. 1 is a perspective view of that part of the invention which comprises the reeling mechanism;

Fig. 2 is a perspective view of that part of the invention which comprises the movable line-carrying device;

Fig. 3 is a schematic diagram of the electrical circuit utilized within said movable, line-carrying device.

The present invention has been conceived with a view towards providing a remedy for a problem which faces every fisherman who uses either a rod and reel or a simple drop-line. As is well known, it is highly desirable when fishing to locate the fishing lure at various points upon the surface of the water in the hope that the said lure will serve to attract fish swimming in the vicinity thereof. However, the problem of locating a fishing line with accuracy for the above-mentioned purpose has, to say the least, proven to be a source of great difficulty. In the past, it has been partially solved by the development of various casting techniques whereby the lure is hurled through the air at the end of a fishing line to the desired position upon the water to be fished. Such techniques have necessitated considerable individual skill and practice, and have furthermore been confined within a fairly limited distance. In addition, there are situations where such casting is impracticable for other reasons. Thus, for example, when a fisherman is engaged in fishing from the side of a crowded fishing boat, the danger of inflicting injury upon a fellow fisherman by catching a fishing hook upon him becomes unduly great if casting is attempted, and it becomes necessary to merely drop the fishing line along the side of the boat in the hope that fish will be in the vicinity, or, in the alternative, to move the boat to a more desirable location.

The present invention seeks to obviate such inconvenience as well as to provide means for locating a fishing line well beyond the range attainable by even the most highly developed casting skill. This goal is achieved with a minimum of effort and with no inconvenience to the user of the said invention.

Referring in detail to the drawing, the embodiment of the invention therein shown comprises two units, each of which cooperates with the other. The first of these comprises a mobile, floatable body 10 having the conformation and colouring of a fish. The said body 10 may be constructed of wood, metal, plastic or other suitable material, and incorporates thereon a fish tail 11, a fin 12 on each side of the said body 10 (one fin not being shown), a mouth 13 and a pair of eyes 14 appropriately located. A rectangular opening 15 is also contained within the body 10 and incorporates a suitable recess 16 wherein is placed four small dry-cell batteries 17 of the flashlight type. These batteries 17 are used to drive a small electric motor 18 which is also mounted within the rectangular opening 15. The said motor 18 is actuated by a starting switch 19, also mounted within the said opening 15, and rotates a drive shaft 20 connected to a small propeller 21 located externally to the said body 10 and protected from the possibility of fouling by a guard 22 integral with the said body 10, the said guard 22 being located in a position forward of the said propeller 21.

The electrical circuit utilized within the aforesaid mobile body 10 is best understood by referring to the circuit diagram illustrated in Fig. 3. Thus, it is to be noted that the electric current arising from the batteries 17 passes by way of a series circuit through the starting switch 19, which may be of the pushbutton type, a small mercury switch 23, to the electric motor 18, and thence back to the said batteries 17.

The mercury switch 23 is suitably mounted on the lower portion of a crank portion 24 of a heavy cross-wire 25 positioned within the said opening 15 and rotatably mounted in the sides of the said body 10. One end of the said cross-wire 25 extends through the side of the body 10 and thereafter is bent so as to form an arm 26 at right angles to the cross-wire 25. The said arm 26 terminates in a small, closed circular loop 27 which holds one end of a small tension spring 28. The other end of the said spring 28 is attached to the circular eye 29 contained within a small metallic upright member 30 permanently mounted upon the upper exterior surface of the said body 10. It is the function of the said tension spring 28 to hold the cross-wire 25 in position during operation of the electric motor 18 so that the mercury switch 23 will be tilted to maintain a closed circuit. The spring 28 also serves to maintain a disengaging shaft 31 in a closed position, as shall be hereinafter more fully described. Thus the aforesaid crank portion 24 of the cross-wire 25 is movably attached to the closed loop 32 found at one end of the said disengaging shaft 31 which in turn passes through a short hollow shaft 33, affixed upon and projecting axially from the rear surface of the fish tail 11, and an inverted channel member 34. The said inverted channel member 34 is adapted to receive the said disengaging shaft 31 and allow it to slide in cooperation with the rotation of the said cross-wire 25 from a position whereby it closes the said inverted channel member 34 to a position whereby it opens same or vice versa. More specifically, the said closing action is accomplished simply by the reception of the said disengaging shaft 31 within a suitable opening 35 located on the lower part of one vertical leg of the said inverted channel member 34; and the opening action is accomplished by merely with-drawing the said disengaging shaft 31 from the aforesaid opening 35.

The said cross-wire 25 may be rotated through the agency of a release line 36 fastened at one end to the loop 27. The other end of the said release line 36 passes through a number of guides 37, mounted upon an inclined rod 38, and is wound around a rotatable returning reel 39 drivable by a returning motor 40, the latter being actuated by a return switch 41. The switch 41, motor 40, reel 39 and rod 38 are all suitably mounted upon a substantially firm base 42, thereby comprising the second aforementioned cooperating unit of this invention, the said unit being retained by or in the vicinity of the fisherman during the course of his fishing.

To operate the invention, a fishing line 10 carrying a suitable fishing lure (not shown) is placed within the inverted channel member 34 so as to be secured therein when the disengaging shaft 31 has closed the said channel member 34. It is noteworthy that when the disengaging shaft 31 is in the said closed position, the switch 23 mounted upon the crank portion 24 of the cross-wire 25 is tilted into a position whereby electrical current may pass through the said switch 23. The fishing line having been secured as set forth above, the motor 18 is actuated by pushing the starting switch 19, and thereby rotating the propeller 21. Then the body 10 is placed upon the surface of the water to be fished and pointed in the direction where the fishing line is to be taken. The return switch 41 is in an off position during this operation, thus allowing the release line 36 to be freely unwound from the returning reel 39 by any movement of the body 10. When the said body 10 is placed upon the water as aforesaid, and appropriately pointed, it is released and allowed to move to that point where it is desired to drop the lure. Then the fisherman, who has kept the said body 10 within his view during the said movement thereof, pushes the return switch 41 to an on position, thereby actuating the returning motor 40 and initiating the rewinding of the returning reel 39. The sudden initial pull to which the release line 36 is subjected by the said rewinding action of the returning reel 39 has a two-fold effect. Not only does it rotate the cross-wire 25 by means of the leverage exerted thereon by the arm 26 so as to tilt the mercury switch 23 into an off position wherein no electrical current may pass through the said switch 23, thus turning off the motor 18, but the said rotation also slides the disengaging shaft 31 into a position whereby the inverted channel member 34 is opened, thereby allowing the fishing line carried by the said inverted channel member 34 and secured therein to be dropped therefrom to the desired fishing position. The turning off of the motor 18 and the release of the fishing line having been accomplished, the continued rewinding action of the returning reel 39 pulls the mobile body 10 back into the vicinity of the fisherman where he may easily recover same. The return switch 41 may then be pushed into an off position as desired.

The employment of the above invention as set forth herein may be repeated as often as desired. It is obvious from the above discussion that the present invention is possessed of various advantages including the carrying of a fishing line to a great distance from its user with but little effort or skill being exercised by him. No danger is involved in the use of the device and an increase in the amusement to be derived from the sport of fishing is arrived at by the elimination of the tiresome necessity of casting the fishing line.

The embodiments of the invention illustrated and described hereinabove have been selected for the purpose of clearly setting forth the principles involved. It will be apparent, however, that the present invention is susceptible of being modified in respect to details of construction, combination and arrangement of parts which may be resorted to without departure from the spirit and scope of the invention as claimed.

Having thus described my invention, I claim as new and desire to secure by Letters Patent of the United States:

An improved fishing line carrier comprising in combination floatable means having means for driving said floatable means upon the surface of fishing waters and means for releasably engaging a fishing line, said means for driving the said floatable means comprising a plurality of electric batteries, a mercury switch, a starting switch, and an electric motor all connected in series, a drive shaft connected to said motor, a propeller mounted upon the said drive shaft in a position external to the said floatable means, the said motor being actuated by the said push-button switch, a rotatable cross-wire mounted within the said floatable means and having a crank position mounting said mercury switch, the said mercury switch being tiltable by the rotation of the said cross-wire to a position wherein it closes the said series circuit and to an alternative position wherein it opens the said circuit, spring means to normally maintain the cross-wire in the former position, the said means for releasably engaging a fishing line comprising a disengaging shaft movably affixed at one end thereof to the said crank portion of the said cross-wire, a short hollow shaft permanently affixed to the rearward portion of the said floatable means and slidably mounting said disengaging shaft, the said hollow shaft also being permanently affixed to an inverted channel member adapted to slidably receive in a closed position the said disengaging shaft within an aperture contained in one leg of the said channel member when the said cross-wire is in its said normal position and to allow the said disengaging shaft to slide to an open position when the said cross-wire is rotated to a position wherein the said mercury switch is tilted to open the said series circuit.

References Cited in the file of this patent

UNITED STATES PATENTS

| | | |
|---|---|---|
| 1,446,816 | Taylor et al. | Feb. 27, 1923 |
| 1,461,650 | Falzer et al. | July 10, 1923 |
| 1,801,866 | Jennings | Apr. 21, 1931 |
| 1,850,296 | Vermeulen | Mar. 22, 1932 |
| 1,871,177 | Held | Aug. 9, 1932 |
| 2,139,072 | Fisher et al. | Dec. 6, 1938 |
| 2,562,054 | Mathieu | July 24, 1951 |
| 2,693,047 | Lumsden | Nov. 2, 1954 |